United States Patent
Tsai et al.

(10) Patent No.: US 8,498,243 B2
(45) Date of Patent: Jul. 30, 2013

(54) APPARATUS AND METHOD FOR CHANNEL ERROR CONTROL OF NON-EXCLUSIVE MULTIPLEXING FOR CONTROL CHANNELS

(75) Inventors: Ming-Chang Tsai, San Diego, CA (US); Jigneshkumar P. Shah, San Diego, CA (US); Kanu Chadha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 12/481,169

(22) Filed: Jun. 9, 2009

(65) Prior Publication Data
US 2009/0310536 A1 Dec. 17, 2009

Related U.S. Application Data

(60) Provisional application No. 61/060,696, filed on Jun. 11, 2008.

(51) Int. Cl.
*H04W 4/00* (2009.01)
*H04J 3/16* (2006.01)
*H04J 3/22* (2006.01)

(52) U.S. Cl.
USPC .......................................... 370/328; 370/465

(58) Field of Classification Search
USPC ............................ 370/328, 465; 714/777, 704
See application file for complete search history.

(56) References Cited

U.S. PATENT DOCUMENTS

| | | | |
|---|---|---|---|
| 5,831,978 A | 11/1998 | Willars et al. | |
| 6,553,535 B1 * | 4/2003 | Asada et al. | 714/777 |
| 6,757,337 B2 * | 6/2004 | Zhuang et al. | 375/267 |
| 6,775,254 B1 | 8/2004 | Willenegger et al. | |
| 7,065,167 B2 * | 6/2006 | McClellan | 375/353 |
| 7,178,089 B1 * | 2/2007 | Frenger et al. | 714/774 |
| 2002/0059551 A1 * | 5/2002 | Alamouti | 714/792 |
| 2004/0101063 A1 * | 5/2004 | Sipila | 375/267 |
| 2004/0151109 A1 | 8/2004 | Batra et al. | |
| 2005/0100076 A1 | 5/2005 | Gazdzinski et al. | |

(Continued)

FOREIGN PATENT DOCUMENTS

| | | |
|---|---|---|
| CN | 1677898 A | 10/2005 |
| CN | 1961530 A | 5/2007 |

(Continued)

OTHER PUBLICATIONS

International Search Report & Written Opinion—PCT/US09/046950 International Search Authority—European Patent Office—Jan. 26, 2010.
Taiwan Search Report—TW098119572—TIPO—Jul. 20, 2012.

*Primary Examiner* — Farah Faroul
(74) *Attorney, Agent, or Firm* — Donald C. Kordich (57) ABSTRACT

An apparatus and method for non-exclusive multiplexing of at least one active control channel comprising preparing the at least one active control channel for transmission in a next frame using a transmitter data processor; assessing channel robustness of the at least one active control channel based on a channel robustness threshold; and if the channel robustness threshold is not met, performing constellation control or power control on the at least one active control channel which is active prior to transmitting the at least one active control channel; or if the channel robustness threshold is met, transmitting the at least one active control channel using a transmitter.

34 Claims, 10 Drawing Sheets

U.S. PATENT DOCUMENTS

| | | |
|---|---|---|
| 2005/0213674 A1 | 9/2005 | Kobayashi |
| 2007/0133579 A1* | 6/2007 | Kim .................... 370/403 |
| 2007/0165857 A1 | 7/2007 | Das et al. |
| 2007/0253507 A1* | 11/2007 | Zhou et al. ............ 375/267 |
| 2008/0109701 A1* | 5/2008 | Yu et al. ............... 714/760 |
| 2008/0209302 A1* | 8/2008 | Yang et al. ............ 714/755 |
| 2008/0240151 A1* | 10/2008 | Chitrapu et al. ....... 370/465 |
| 2008/0310352 A1* | 12/2008 | McBeath et al. ....... 370/329 |
| 2009/0154927 A1* | 6/2009 | Oksman .................. 398/76 |
| 2009/0213955 A1* | 8/2009 | Higuchi et al. ......... 375/267 |
| 2009/0303937 A1 | 12/2009 | Sawahashi et al. |
| 2011/0249634 A1* | 10/2011 | Lee et al. .............. 370/329 |

FOREIGN PATENT DOCUMENTS

| | | |
|---|---|---|
| EP | 1387517 A1 | 2/2004 |
| EP | 1944896 A1 | 7/2008 |
| JP | 2005286446 A | 10/2005 |
| JP | 2006345363 A | 12/2006 |
| RU | 2192100 C2 | 10/2002 |
| RU | 2293441 | 2/2007 |
| WO | 2006121864 A2 | 11/2006 |
| WO | 2006134946 A1 | 12/2006 |
| WO | WO2007039908 | 4/2007 |
| WO | 2007133051 A2 | 11/2007 |

* cited by examiner

APPARATUS AND METHOD FOR CHANNEL ERROR CONTROL OF NON-EXCLUSIVE MULTIPLEXING FOR CONTROL CHANNELS

CLAIM OF PRIORITY UNDER 35 U.S.C. §119

The present Application for patent claims priority to Provisional Application No. 61/060,696 entitled "Channel Error Control of Non-Exclusive Multiplexing for Forward Link Control Signaling" filed Jun. 11, 2008, and assigned to the assignee hereof and hereby expressly incorporated by reference herein.

FIELD

This disclosure relates generally to apparatus and methods for channel error control. More particularly, the disclosure relates to channel error control of non-exclusive multiplexing of control channels, e.g., forward link control signaling.

BACKGROUND

Wireless communication systems provide a variety of communication services to mobile users that are away from the fixed telecommunications infrastructure or are moving. These wireless systems employ radio transmissions to interconnect mobile devices with various base stations in the service area. The base stations, in turn, are connected to mobile switching centers which route connections to and from the mobile devices to others on various communication networks such as the public switched telephony network (PSTN), Internet, etc. In this manner, users that are away from their fixed sites or are on the move may receive various communication services such as voice telephony, paging, messaging, email, data transfers, video, Web browsing, etc.

Due to the use of radio frequencies for wireless interconnection, all mobile users must agree on a common set of protocols to share the scarce radio spectrum allocated for wireless communication services. One important protocol relates to the access method used to connect multiple mobile devices to the wireless communication network. Various access methods include frequency division multiple access (FDMA), time division multiple access (TDMA), code division multiple access (CDMA), and orthogonal frequency division multiplex (OFDM).

SUMMARY

Disclosed are an apparatus and method for channel error control of non-exclusive multiplexing of control channels, e.g., forward link control signaling. According to one aspect, a method for non-exclusive multiplexing of at least one active control channel comprising preparing the at least one active control channel for transmission in a next frame using a transmitter data processor; assessing channel robustness of the at least one active control channel based on a channel robustness threshold; and if the channel robustness threshold is not met, performing constellation control or power control on the at least one active control channel prior to transmitting the at least one active control channel; or if the channel robustness threshold is met, transmitting the at least one active control channel using a transmitter.

According to another aspect, a base station for non-exclusive multiplexing of at least one active control channel, the base station comprising: a transmitter data processor for preparing the at least one active control channel for transmission in a next frame; a control processor for assessing channel robustness of the at least one active control channel based on a channel robustness threshold; and a symbol modulator coupled to the control processor for performing constellation control or power control on the at least one active control channel, prior to transmission of the at least one active control channel, if the channel robustness threshold is not met; and a transmitter for transmitting the at least one active control channel if the channel robustness threshold is met.

According to another aspect, a base station for non-exclusive multiplexing of at least one active control channel, the base station comprising means for preparing the at least one active control channel for transmission in a next frame using a transmitter data processor; means for assessing channel robustness of the at least one active control channel based on a channel robustness threshold; and means for performing constellation control or power control on the at least one active control channel, prior to transmitting the at least one active control channel, if the channel robustness threshold is not met; or means for transmitting the at least one active control channel if the channel robustness threshold is met.

According to another aspect, a computer-readable medium including program code stored thereon, comprising: program code for preparing the at least one active control channel for transmission in a next frame using a transmitter data processor; program code for assessing channel robustness of the at least one active control channel based on a channel robustness threshold; and program code for performing constellation control or power control on the at least one active control channel, prior to transmitting the at least one active control channel, if the channel robustness threshold is not met; or program code for transmitting the at least one active control channel if the channel robustness threshold is met.

Advantages of the present disclosure may include (1) allowing channel robustness of non-exclusive multiplexing to be specified and guaranteed frame-by-frame, (2) allowing specified channel robustness of non-exclusive multiplexing to be achieved with minimum necessary power increase frame-by-frame, and (3) allowing non-exclusive multiplexing to outperform exclusive multiplexing in over-the-air (OTA) efficiency at the cost of higher system complexity.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
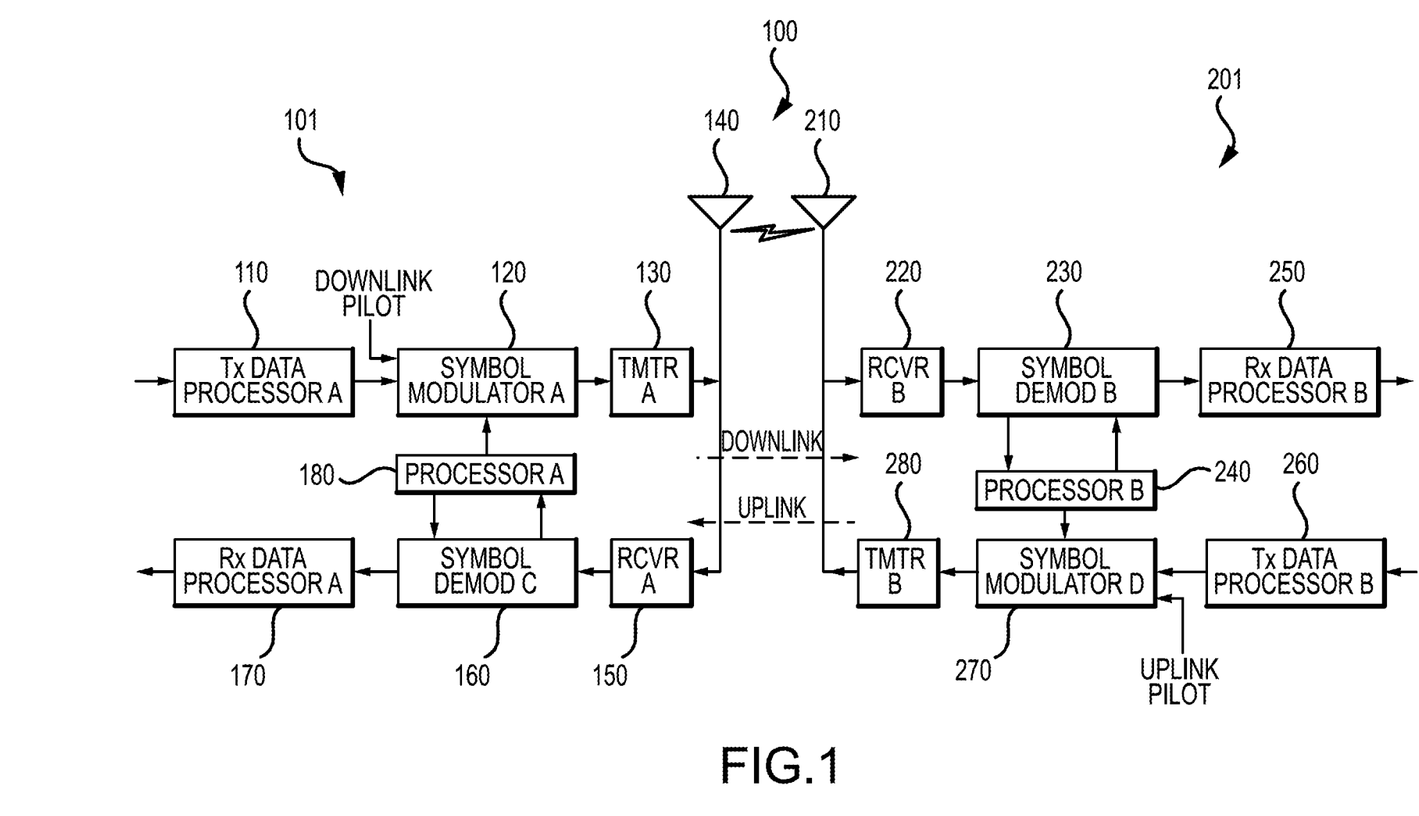
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device or mobile station). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
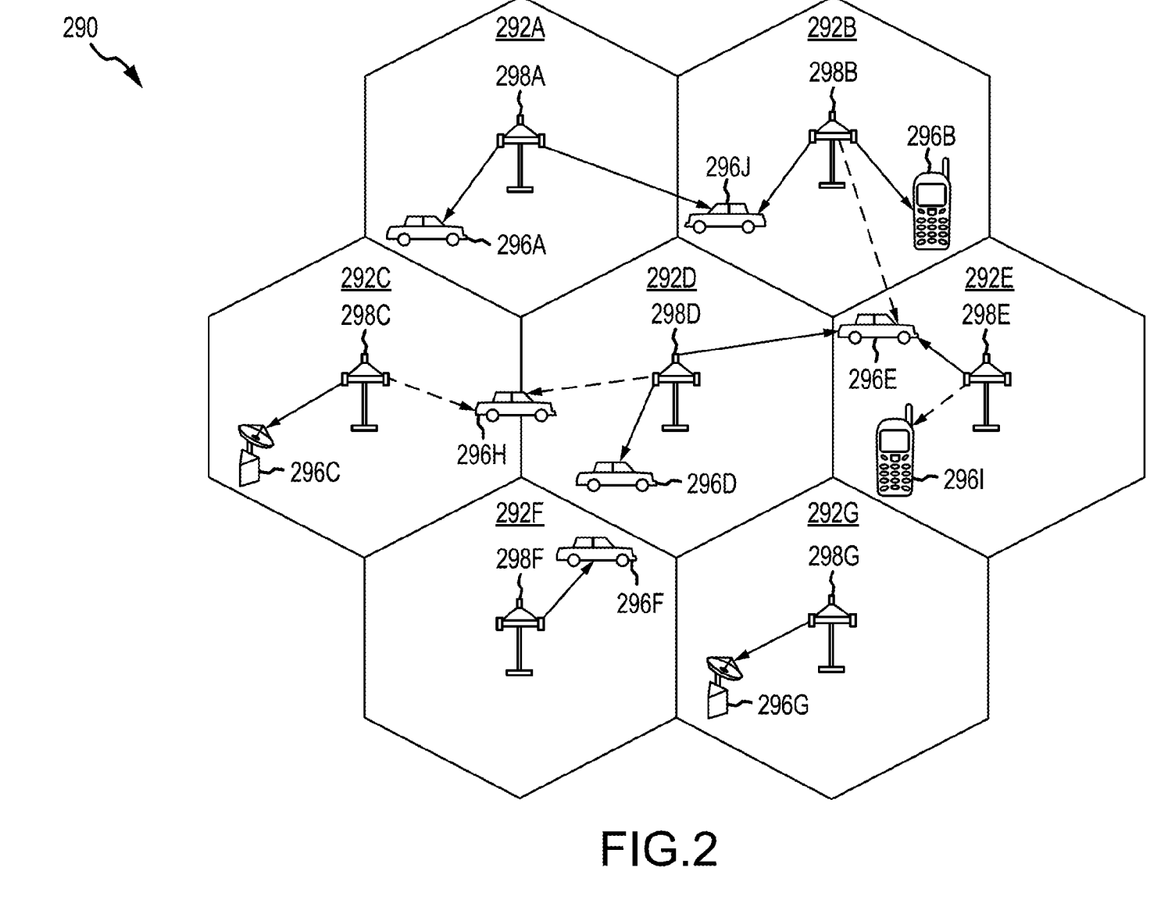
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively. Inter-system (i.e., inter-radio access technology (IRAT) transition) handover occurs when an ongoing call is transitioned between a cell of one network and a cell of another network. Such a transition may occur, for example, between a WCDMA site and a GSM site.

Multiplexing is a generic technique in wireless communications to share communication resources among a plurality of users. In general, communication resources such as time slots and/or frequency channels are shared in a systematic manner for common usage of the propagation medium by several users. There are two general types of multiplexing methods: exclusive (dedicated) and non-exclusive (shared). Exclusive multiplexing techniques may be used to provide an orderly sharing of scarce resources, and exclusive multiplexing techniques are robust in a wireless propagation environment. On the other hand, non-exclusive multiplexing techniques may be used for improved resource efficiency since they do not require exclusive resource assignments. A desirable goal in wireless system design is to attain the high resource efficiency of non-exclusive multiplexing techniques simultaneously with the channel robustness properties of exclusive multiplexing techniques.

The present disclosure describes an approach for channel error performance control of non-exclusive multiplexing of forward link control signaling (FLCS). In one aspect, FLCS can be viewed as a control channel for transporting various signaling channels between mobile terminals and the wireless network. Signaling channels are overhead channels in a wireless system for supporting the management and control of user channels which carry the desired information. One advantage of the disclosed approach is an improved over-the-air (OTA) resource utilization efficiency by non-exclusive multiplexing in mobile wireless communications without compromising channel robustness.

In one example, FLCS is exclusively allocated among mobile terminals and has high OTA resource utilization efficiency. Well known examples of exclusive multiplexing include time-division multiplexing (TDM), frequency-division multiplexing (FDM), and code-division multiplexing (CDM), with or without transmission diversity, and combinations of some or all of the above. However, fully exclusive FLCS multiplexing ensures system operation robustness of the overhead signaling channels at the cost of utilization of scarce OTA resources which are shared between FLCS and forward link (FL) user data. That is, the availability of resources for user data channels is diminished when exclusive multiplexing is employed for the FLCS.

Improved OTA efficiency may be attained by non-exclusive multiplexing at the cost of imperfect isolation among destinations as well as weakened immunity towards channel distortion. With non-exclusive multiplexing, multiple mobile terminals monitor shared OTA resources for potential FLCS signaling channels. However, some non-exclusive multiplexing approaches require error validation which may not be correct due to channel errors. If the channel error mitigation strategy is simply to assign more scarce OTA resources, then the usefulness of non-exclusive multiplexing is limited.

The non-exclusive multiplexing approach of the present disclosure is directed towards robustness against channel errors to allow a non-exclusive multiplexing scheme as a true alternative to exclusive multiplexing for OTA efficiency improvement in mobile wireless communication systems. And, the non-exclusive multiplexing approach is not limited to FLCS.

Figure 3:
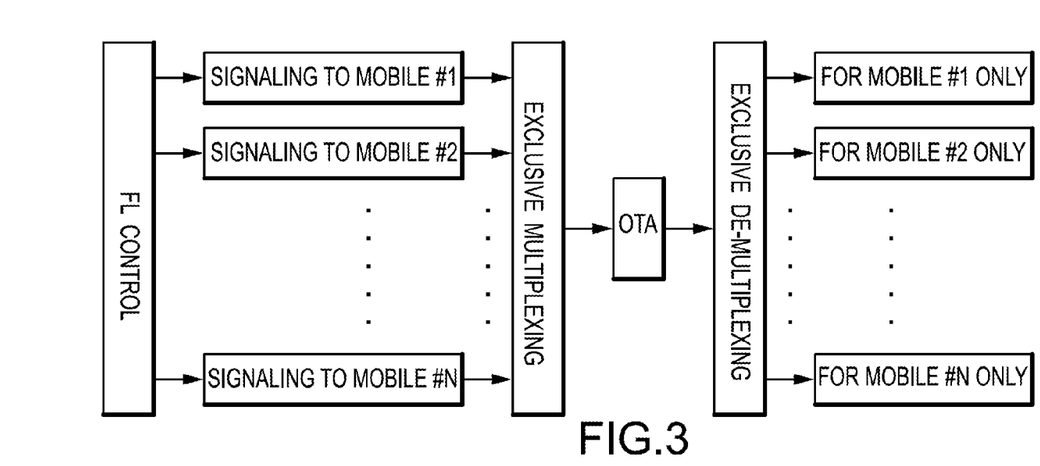
FIG. 3 illustrates an example diagram of an exclusive multiplexing of a control channel, e.g., forward link control signaling (FLCS).

In one aspect, FLCS multiplexing design may employ exclusive multiplexing for control of individual mobile terminals. For example, exclusive multiplexing can be achieved through TDM, where individual mobiles are assigned separate and dedicated time slots for monitoring and receiving FLCS from base stations without ambiguity. Exclusive multiplexing can also be achieved through FDM, CDM, etc., or combination of any multiplexing schemes, where mobile terminals are assigned separate and dedicated logical channel resources for FLCS to reach individual mobiles individually. FIG. 3 illustrates an example diagram of an exclusive multiplexing of a control channel, e.g., forward link control signaling (FLCS).

Exclusive multiplexing is not the most efficient multiplexing technique since physical channel resources assigned to individual mobile terminals are likely not be fully utilized at all times. To improve the multiplexing efficiency, the same physical channel resources can be shared by a pre-determined group of mobile terminals. Each mobile terminal may monitor all messages received from the physical channel resources assigned to its mobile group and look for a destination indication in the content of the messages.

Figure 4:
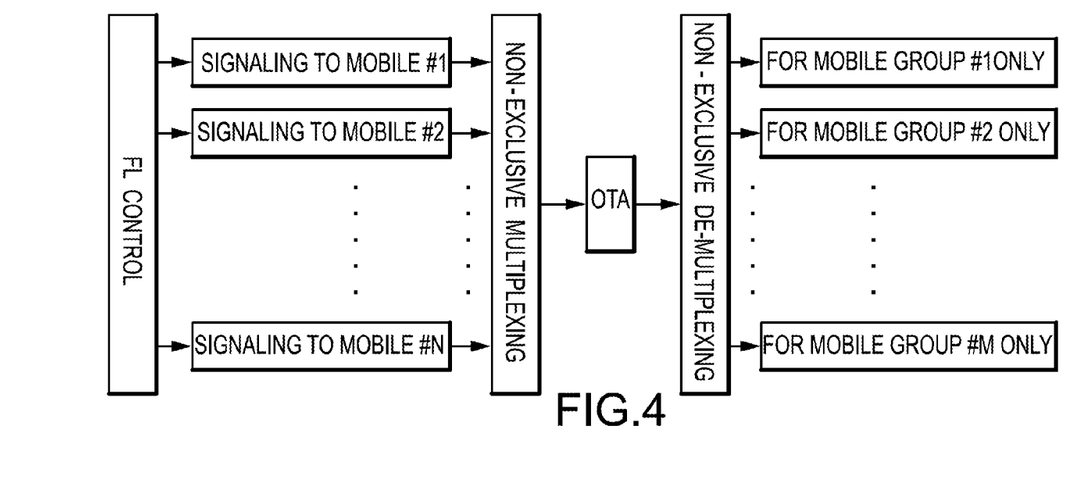
FIG. 4 illustrates an example diagram of a non-exclusive multiplexing of a control channel, e.g., forward link control signaling (FLCS).

In one example, Ethernet packet transmission typically assumes ideal transport, provided either from near-perfect physical channel characteristics or through use of a retransmission protocol when latency is tolerable. In either case, the destination address or device identification is embedded within the received message to indicate the intended destination of the packet. In contrast, for wireless mobile communication systems, non-ideal transport is a fundamental assumption, due to nature of mobile channels and the cost of latency due to retransmission. These constraints result in a non-zero probability of control message error where one mobile terminal is mistaken for another mobile terminal due to OTA channel errors. The control message error probability is typically small to maintain sufficiently exclusive multiplexing by use of channel coding. In one aspect, channel coding mitigates channel distortion while expending OTA resources. FIG. 4 illustrates an example diagram of an non-exclusive multiplexing of a control channel, e.g., forward link control signaling (FLCS).

One example of an optimized system design is the Forward Shared Control Channel (F-SCCH) of the Ultra Mobile Broadband (UMB) wireless system. On the transmitter side, the F-SCCH message has a 16-bit cyclic redundancy check (CRC) code added before being scrambled with medium access control identifier (MAC ID), followed by convolutional encoding with code rate $R=\frac{1}{3}$ and constraint length $K=9$.

On the receiver side, each mobile receiver carries out Viterbi decoding once per monitored and received F-SCCH message before de-scrambling in at least two different times with a broadcast MAC ID and a unicast MAC ID. The resultant CRC code is then validated to confirm the following: (1) the F-SCCH message has been received correctly, and (2) the F-SCCH message is intended for the mobile terminal. One problem with such optimization, for example, is that even with the 16-bit CRC used, there is still $2*2^{-16}$ probability of error translating into one potential FL control error per mobile terminal every ~30 seconds for the UMB system where the physical frame duration is approximately 1 msec. Although the error probability could be reduced with a longer CRC code, using a longer CRC code would contradict the rationale for usage of non-exclusive multiplexing and contribute to inefficiency.

Non-exclusive multiplexing error means loss of throughput for user data, but it could also have greater implications for control signaling. Therefore, it is desirable to enhance channel error control of non-exclusive multiplexing without losing its efficiency advantage. In one example, the problem of channel robustness in non-exclusive multiplexing can be analyzed and compensated at the transmitter, for example, using multiplexing constellation, similar to that of modulation constellation. In one aspect, error control for non-exclusive multiplexing includes using multiplexing constellation to determine how channel errors turn into multiplexing errors. Non-exclusive multiplexing constellation is time-varying depending on the need for signaling to active users, and multiplexing performance can be improved by means of constellation control and power control.

Figure 5:
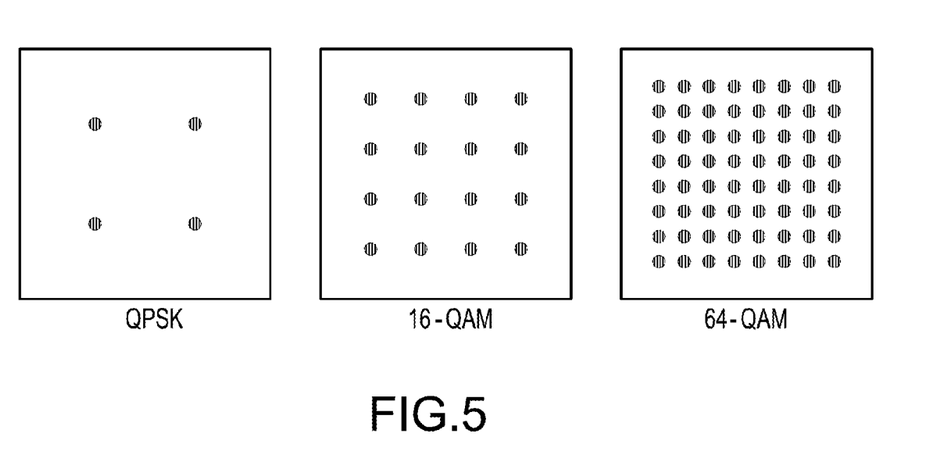
FIG. 5 illustrates three examples of modulation constellations.

Data modulation channel robustness depends heavily on the map of modulation constellation versus the transmit power. FIG. 5 illustrates three examples of modulation constellations. Modulation constellations such as quaternary phase shift keying (QPSK), 16-QAM (16-quadrature amplitude modulation), 64-QAM (64-quadrature amplitude modulation), as shown in FIG. 5, are commonly used. Given the transmission power as a constraint, the highest modulation order possible within desired noise immunity is usually selected.

Figure 6:
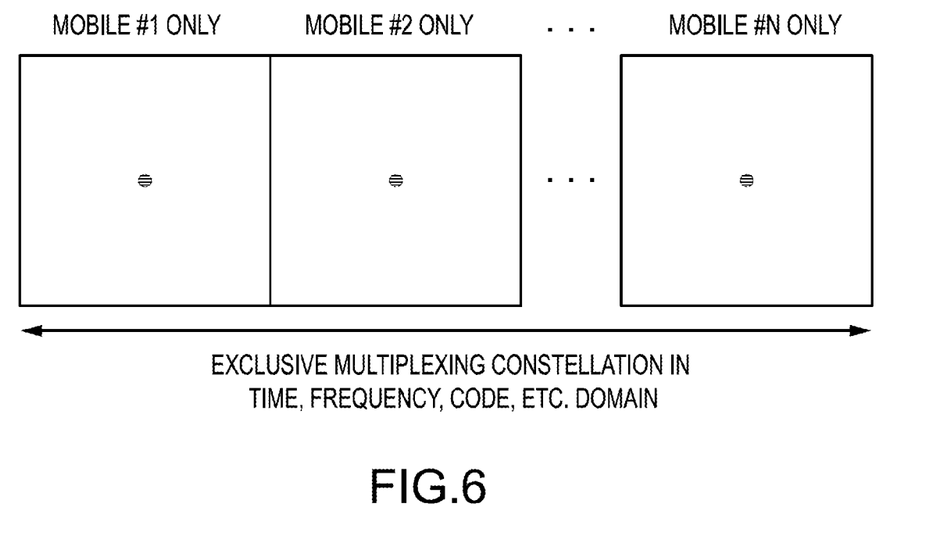
FIG. 6 illustrates an example of an exclusive multiplexing constellation.

FIG. 6 illustrates an example of an exclusive multiplexing constellation. Applying a similar concept, multiplexing channel robustness can be analyzed with the example multiplexing constellation as shown in FIG. 6 for exclusive multiplexing. Unlike the modulation constellations shown in FIG. 5, there is no ambiguity in the exclusive multiplexing constellation given that each mobile terminal has its own dedicated logical channel assignment. Channel noise can only cause errors in data or signaling received at the intended mobile terminal and will not confuse other mobile terminals.

Figure 7:
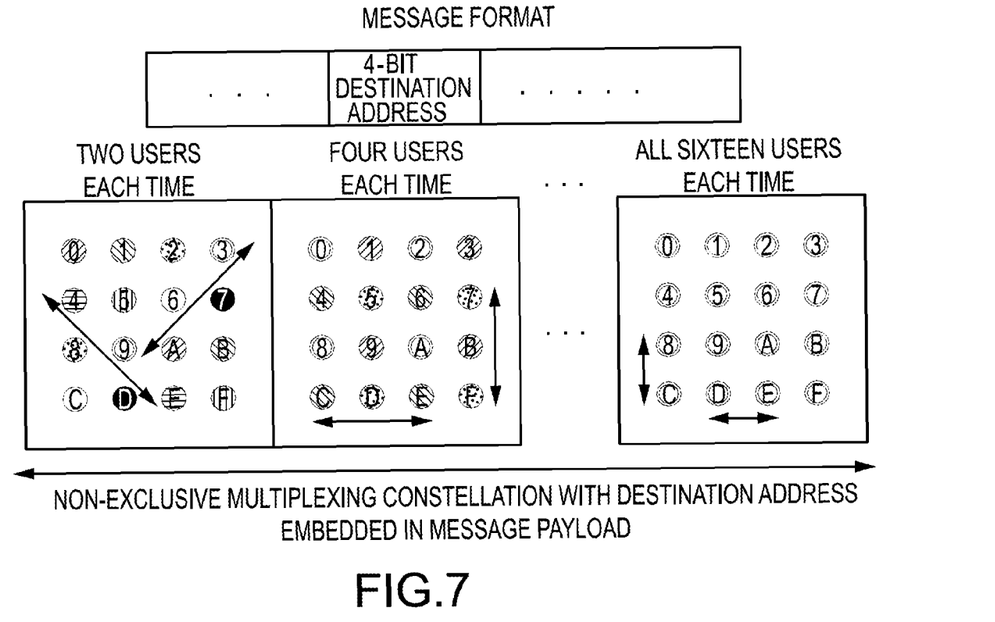
FIG. 7 illustrates an example of a non-exclusive multiplexing constellation using a 4-bit embedded destination address.

On the other hand, non-exclusive multiplexing constellations can often look very similar to modulation constellations when the destination address is embedded as part of payload. FIG. 7 illustrates an example of a non-exclusive multiplexing constellation using a 4-bit embedded destination address, which allows up to 16 users to share the logical channel. In the example in FIG. 7, the destination address is embedded in the message payload. With proper scheduling, the channel robustness improves as the spacing increases among constellation points with decreasing number of users. Although FIG. 7 illustrates a 4-bit embedded destination address being used by the non-exclusive multiplexing constellation, one skilled in the art would understand that other quantity of bits (e.g., r-bit) can be used for the embedded destination address without affecting the scope or spirit of the present disclosure.

Figure 8:
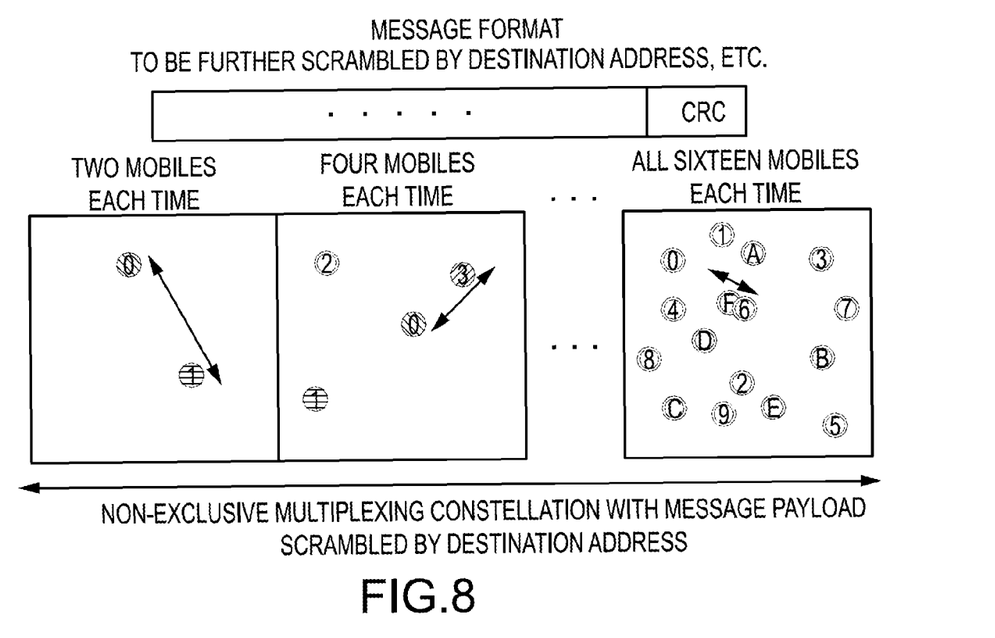
FIG. 8 illustrates an example of a non-exclusive multiplexing constellation using destination address for scrambling.

In one aspect, a non-exclusive multiplexing constellation can sometimes be more dynamic and difficult to analyze when the message is scrambled with destination address as part of the key. FIG. 8 illustrates an example of a non-exclusive multiplexing constellation using destination address for scrambling. In FIG. 8, the non-exclusive multiplexing constellation includes a message payload that is scrambled by the designation address. Data dependent cyclic redundancy check (CRC) codes and time based scrambling of the F-SCCH channel result in a time-varying and uniformly distributed constellation. The spacing among constellation points, commonly used as indication of channel robustness, becomes a random variable with the same worst case distance independent of the number of users.

Conventional solutions designed around exclusive multiplexing would increase either the CRC code size or the transmission power, negating the efficiency advantage of non-exclusive multiplexing and rendering it inferior to the simplicity of exclusive multiplexing. A CRC code size increase effectively enlarges the multiplexing constellation space but may not necessarily expand the spacing among constellation points given the random nature of non-exclusive multiplexing. Increasing the transmission power for better multiplexing robustness without accounting for the dynamic nature of non-exclusive multiplexing constellation would not necessarily outperform exclusive multiplexing.

In one aspect, the performance metric of channel robustness for data modulation is the average spacing in a selected modulation constellation which is static and fully populated. The performance metric also assumes equal impact from all errors. However, the metric of average spacing is not appropriate for a multiplexing constellation given that some errors may affect system operation more than others. Consequently, the minimum spacing in the multiplexing constellation is important. Also, the minimum spacing in the multiplexing constellation may not improve when operating with fewer mobile terminals. Thus, the random and dynamic nature of non-exclusive multiplexing constellations prevents conventional solutions from effectively improving the channel robustness performance.

Figure 9:
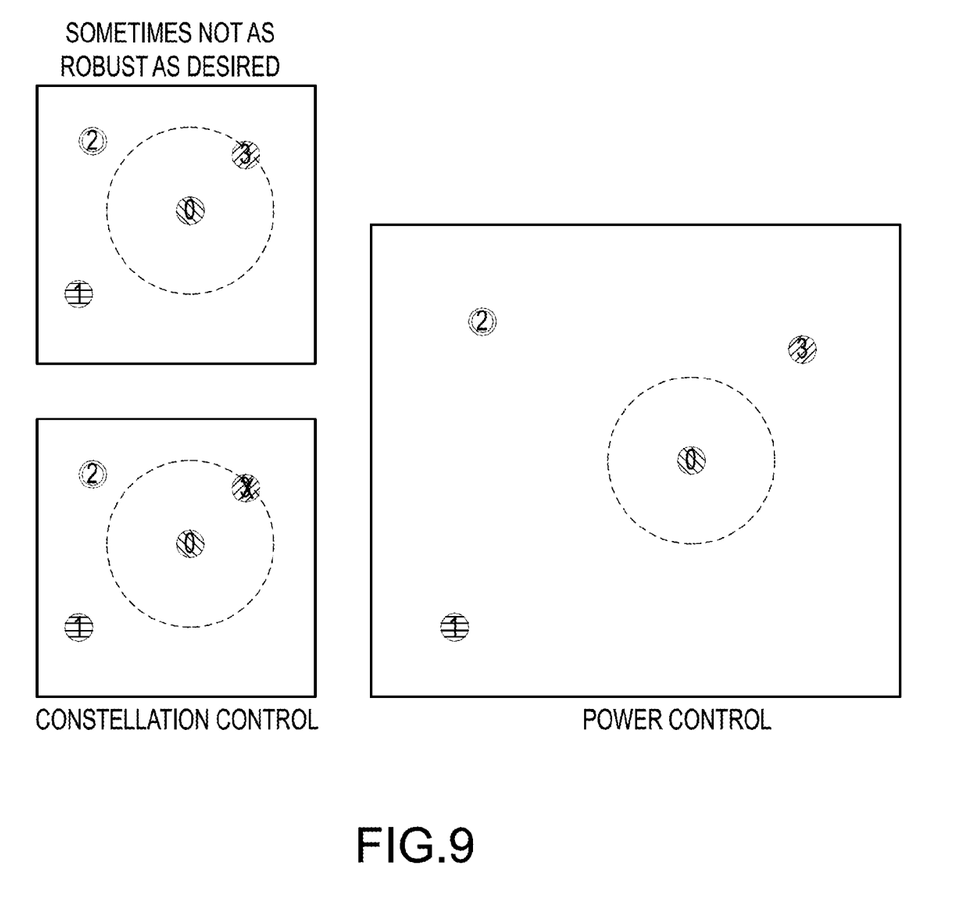
FIG. 9 illustrates an example of a non-exclusive multiplexing constellation and power control.

The approach for channel error performance control of non-exclusive multiplexed forward link control signaling (FLCS) as disclosed in the present disclosure improves channel robustness performance of non-exclusive multiplexing by implementing frame-by-frame constellation control and power control as shown in FIG. 9. FIG. 9 illustrates an example of a non-exclusive multiplexing constellation and power control. The constellation control serves to remove as few constellation points as necessary with as much gain as possible in minimum spacing among constellation points. Removal of constellation points implies canceling or deferring planned control signaling to specific mobile terminals, which, for example, requires cross-layer collaboration with MAC layer protocols or higher layer protocols. If the minimum spacing of the resulting, and potentially modified, multiplexing constellation still does not meet the channel robustness requirement, the transmission power level for individual control signaling can be further adjusted to scale the multiplexing constellation within the allowed range, subject to other system constraints.

In one example, the metric for the minimum spacing of a multiplexing constellation is the Hamming distance between the two CRC codes, one under a perfect channel (no channel errors) condition and the other under a non-perfect channel (with channel errors) condition. Due to the linearity of the CRC operation it can be shown that the CRC code of the channel error corrupted message sequence is simply the Galois Field modulo 2 (GF(2)) sum (also known as the exclusive OR, i.e., XOR) of the CRC code of the message sequence without channel errors and the CRC code of the error syndrome sequence.

$$\mathrm{CRC}(m(x) \oplus e(x)) = \mathrm{CRC}(m(x)) \oplus \mathrm{CRC}(e(x)) \quad (1)$$

where m(x) is the message sequence and e(x) is the error syndrome sequence.

As scrambling and descrambling are also linear operations, the relationship in equation (1) still holds when m(x) is scrambled and when m(x) is descrambled. In one example, a practical implementation is to use a look-up table of pre-computed CRC codes of possible error syndromes under a reasonable SNR operating range. For example, a subset of all possible $2^n$ error syndrome sequences for an n-bit long CRC code can be used to avoid a fully exhaustive error syndrome space search. For each transmit message with possible non-exclusive multiplexing (depending on the number of active MAC IDs) a minimum distance of the corresponding CRC code can be computed by taking the minimum CRC code distance (e.g., Hamming distance) over all possible CRC codes of channel corrupted message sequences, which is the XOR of original CRC code with the CRC code of error syndrome from the look-up table.

Figure 10:
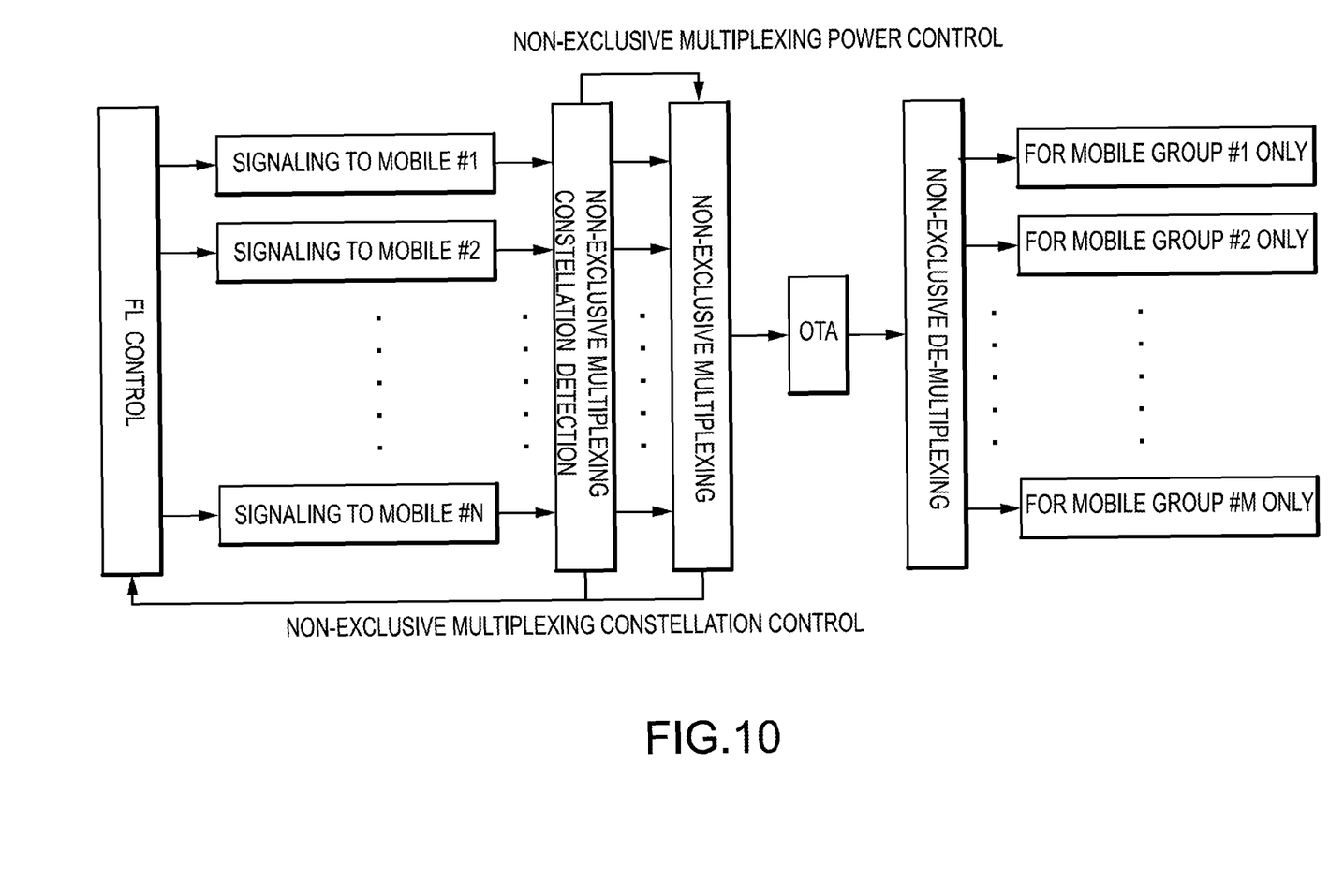
FIG. 10 illustrates an example block diagram for non-exclusive multiplexing of a control channel, e.g., forward link control signaling (FLCS) with error control.

FIG. 10 illustrates an example block diagram for non-exclusive multiplexing of a control channel, e.g., forward link control signaling (FLCS) with error control. A possible architecture for non-exclusive multiplexing of FLCS with constellation and power control to obtain robustness is shown.

Figure 11:
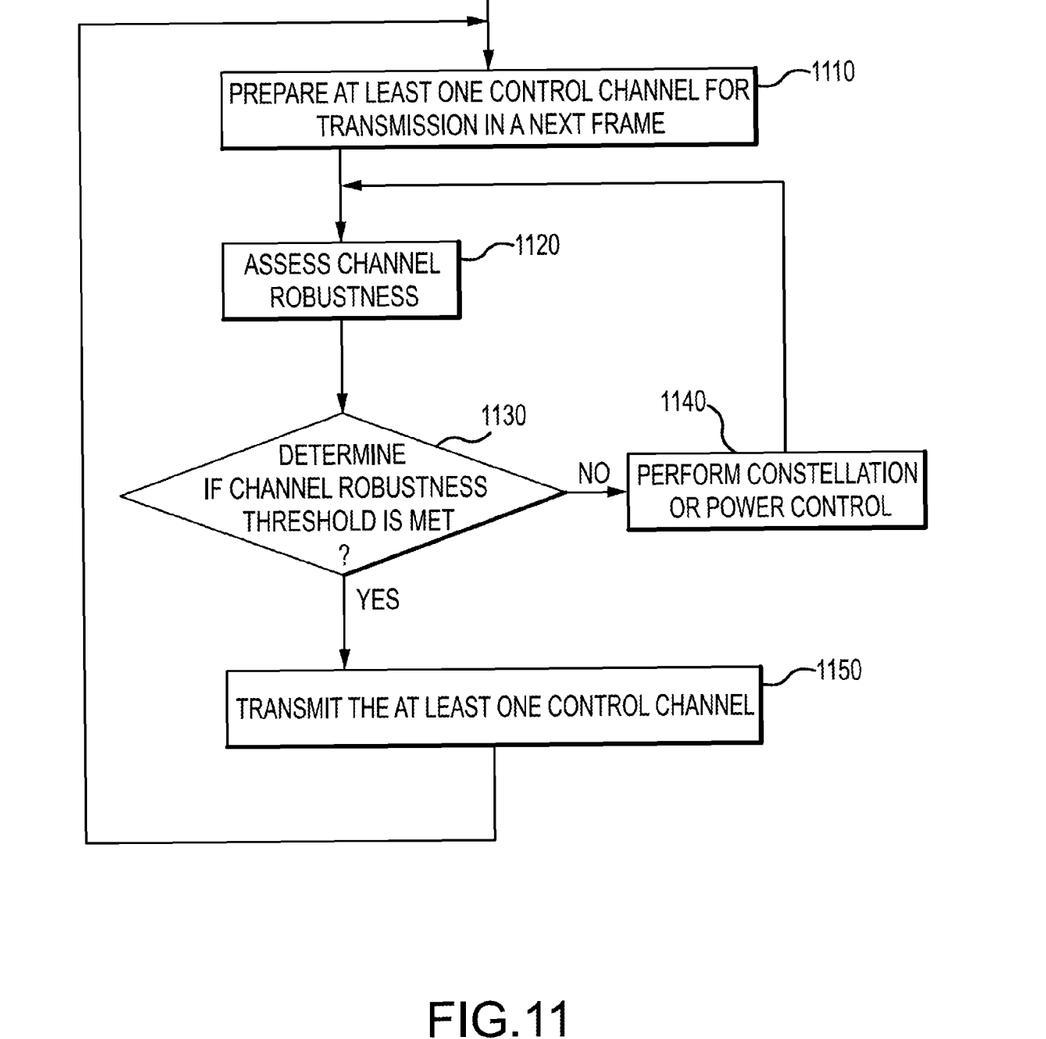
FIG. 11 illustrates an example flow diagram for non-exclusive multiplexing of a control channel, e.g., forward link control signaling (FLCS).

FIG. 11 illustrates an example flow diagram for non-exclusive multiplexing of a control channel, e.g., forward link control signaling (FLCS). In block 1110, prepare at least one control channel for transmission in a next frame wherein the control channel is active. In one example, the control channel is a forward link control signaling (FLCS). In one example, the step of preparing the at least one control channel for transmission is performed by a transmitter data processor, similar to the TX data processor A 110 shown in FIG. 1.

Following block 1110, in block 1120, assess channel robustness of the at least one control channel. In one aspect, one or more of the following metrics are used for assessing channel robustness: signal-to-noise ratio (SNR), fade rate, bit error rate, frame error rate, etc. One skilled in the art would understand that the example metrics disclosed herein are meant to be examples and are not exclusive. Other metrics may be used without affecting the spirit or scope of the present disclosure. In one example, the step of assessing channel robustness is performed by a control processor, similar to the processor A 180 shown in FIG. 1.

In one aspect, a channel robustness threshold is used for assessing channel robustness. In one aspect, the channel robustness threshold is one or more of the following: minimum signal-to-noise ratio (SNR), maximum fade rate, maximum bit error rate, maximum frame error rate, etc. For example, if the channel robustness threshold is met, the channel is considered robust. If, however, the channel robustness is not met, the channel is considered not robust. Following block 1120, in block 1130, determine if the channel robustness threshold is met. If the channel robustness threshold is not met, proceed to block 1140. If the channel robustness threshold is met, proceed to block 1150.

In block 1140, perform constellation control or power control of the at least one control channel which is active. For example, as shown in FIG. 9, one constellation point in the constellation is eliminated to reduce channel error. In one example, the constellation point that is eliminated has the minimum distance (e.g., Hamming distance) from another constellation point. In one example, the constellation includes a cyclic redundancy check (CRC) code. In one example, the step of performing constellation control is performed by a symbol modulator, similar to the symbol modulator A 120 shown in FIG. 1.

In block 1150, transmit the at least one control channel. In one example, the transmitting step is performed by a transmitter, similar to the transmitter A 130 shown in FIG. 1.

In one aspect, the at least one control channel is transmitted with a modified constellation (i.e., the constellation is adjusted) and modified transmission power levels. In one example, the at least one control channel is transmitted using one of the following: time division multiplexing (TDM), frequency division multiplexing (FDM), code division multiplexing (CDM) or a hybrid of any of these three multiplexing schemes. Following block, 1150, return to block 1110 for additional transmission in the next frame.

One skilled in the art would understand that the approach for channel error performance control of non-exclusive multiplexing of forward link control signaling (FLCS) as disclosed herein is applicable to any wireless mobile communication systems, for example but not limited to, the Ultra Mobile Broadband (UMB) wireless system.

One skilled in the art would understand that the steps disclosed in the example flow diagram in FIG. 11 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 12:
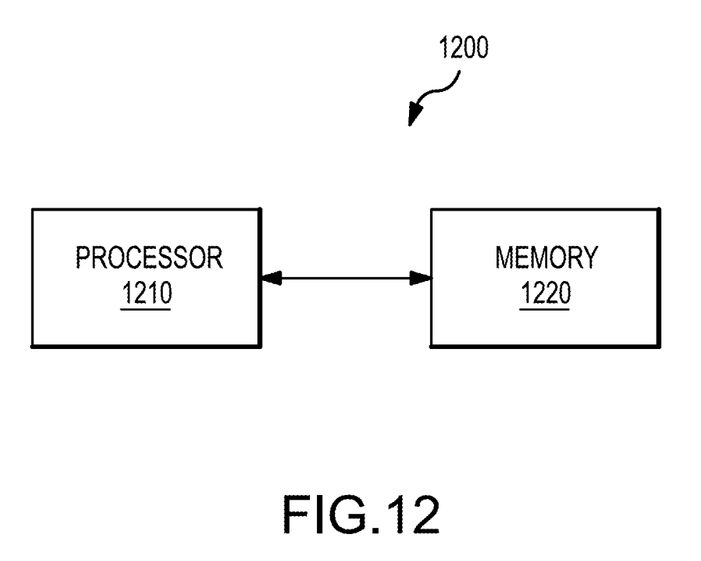
FIG. 12 illustrates an example of a device comprising a processor in communication with a memory for executing the processes for channel error performance control of non-exclusive multiplexing of a control channel, e.g., forward link control signaling (FLCS).

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 12 illustrates an example of a device 1200 comprising a processor 1210 in communication with a memory 1220 for executing the processes for channel error performance control of non-exclusive multiplexing of a control channel, e.g., forward link control signaling (FLCS). In one example, the device 1200 is used to implement the algorithm illustrated in FIG. 11. In one aspect, the memory 1220 is located within the processor 1210. In another aspect, the memory 1220 is external to the processor 1210. In one aspect, the processor includes circuitry for implementing or performing the various flow diagrams, logical blocks and/or modules described herein.

Figure 13:
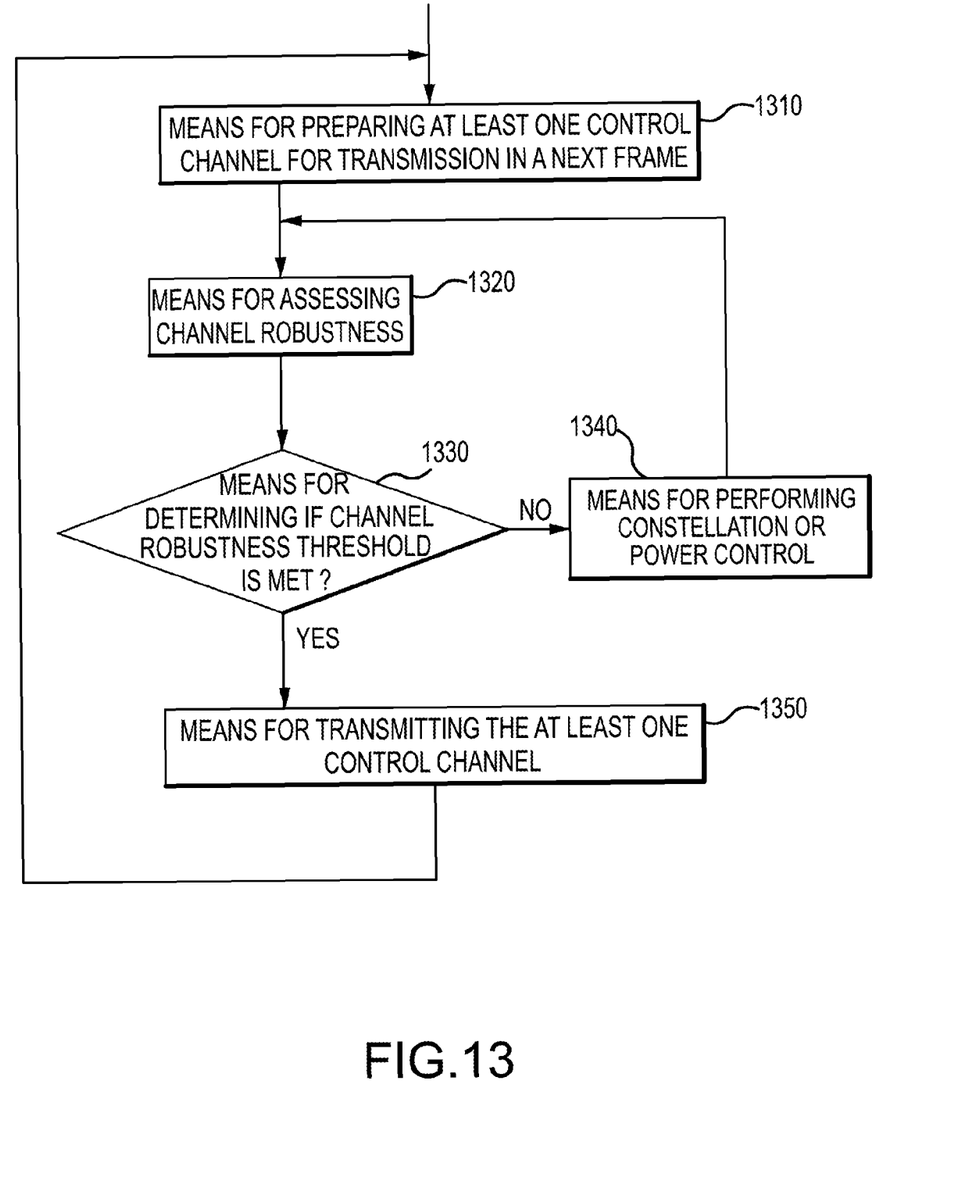
FIG. 13 illustrates an example of a device suitable for channel error performance control of non-exclusive multiplexing of a control channel, e.g., forward link control signaling (FLCS).

FIG. 13 illustrates an example of a device 1300 suitable for channel error performance control of non-exclusive multiplexing of a control channel, e.g., forward link control signaling (FLCS). In one aspect, the device 1300 is implemented by at least one processor comprising one or more modules configured to provide different aspects of channel error performance control of non-exclusive multiplexing of a control channel, e.g., forward link control signaling (FLCS) as described herein in blocks 1310, 1320, 1330, 1340 and 1350. For example, each module comprises hardware, firmware, software, or any combination thereof. In one aspect, the device 1300 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for non-exclusive multiplexing of at least one active control channel comprising:
    preparing the at least one active control channel for transmission in a next frame using a transmitter data processor, wherein the at least one active control channel is prepared for transmission using a non-exclusive multiplexing constellation;
    assessing channel robustness of the at least one active control channel based on a channel robustness threshold; and
    if the channel robustness threshold is not met, performing constellation control or power control on the non-exclusive multiplexing constellation of the at least one active control channel prior to transmitting the at least one active control channel; or
    if the channel robustness threshold is met, transmitting the at least one active control channel using a transmitter.

2. The method of claim 1 wherein the performing constellation control step comprises eliminating a first constellation point in the non-exclusive multiplexing constellation.

3. The method of claim 2 wherein the first constellation point has a minimum distance from a second constellation point in the non-exclusive multiplexing constellation.

4. The method of claim 3 wherein the minimum distance is a Hamming distance.

5. The method of claim 1 wherein the constellation control includes a cyclic redundancy check (CRC) code.

6. The method of claim 1 wherein the channel robustness threshold is based on one of the following metrics: signal-to-noise ratio (SNR), fade rate, bit error rate or frame error rate.

7. The method of claim 1 further comprising transmitting the at least one active control channel using one of time-division multiplexing (TDM), frequency-division multiplexing (FDM), code-division multiplexing (CDM) or a combination thereof.

8. The method of claim 1 wherein the at least one active control channel is a forward link control signaling (FLCS).

9. The method of claim 8 wherein the at least one active control channel is part of a Ultra Mobile Broadband (UMB) wireless system.

10. A base station for non-exclusive multiplexing of at least one active control channel, the base station comprising:
   a transmitter data processor for preparing the at least one active control channel for transmission in a next frame, wherein the at least one active control channel is prepared for transmission using a non-exclusive multiplexing constellation;
   a control processor for assessing channel robustness of the at least one active control channel based on a channel robustness threshold; and
   a symbol modulator coupled to the control processor for performing constellation control or power control on the non-exclusive multiplexing constellation of the at least one active control channel, prior to transmission of the at least one active control channel, if the channel robustness threshold is not met; and
   a transmitter coupled to the symbol modulator for transmitting the at least one active control channel if the channel robustness threshold is met.

11. The base station of claim 10 wherein the symbol modulator performs constellation control by eliminating a first constellation point in the non-exclusive multiplexing constellation.

12. The base station of claim 11 wherein the first constellation point has a minimum distance from a second constellation point in the non-exclusive multiplexing constellation.

13. The base station of claim 12 wherein the minimum distance is a Hamming distance.

14. The base station of claim 10 wherein the constellation control includes a cyclic redundancy check (CRC) code.

15. The base station of claim 10 wherein the channel robustness threshold is based on one of the following metrics: signal-to-noise ratio (SNR), fade rate, bit error rate or frame error rate.

16. The base station of claim 10 wherein the transmitter transmits the at least one active control channel using one of time-division multiplexing (TDM), frequency-division multiplexing (FDM), code-division multiplexing (CDM) or a combination thereof.

17. The base station of claim 10 wherein the at least one active control channel is a forward link control signaling (FLCS).

18. The base station of claim 17 wherein the base station is part of a Ultra Mobile Broadband (UMB) wireless system.

19. A base station for non-exclusive multiplexing of at least one active control channel, the base station comprising:
   means for preparing the at least one active control channel for transmission in a next frame using a transmitter data processor, wherein the at least one active control channel is prepared for transmission using a non-exclusive multiplexing constellation;
   means for assessing channel robustness of the at least one active control channel based on a channel robustness threshold; and
   means for performing constellation control or power control on the non-exclusive multiplexing constellation of the at least one active control channel, prior to transmitting the at least one active control channel, if the channel robustness threshold is not met; or
   means for transmitting the at least one active control channel if the channel robustness threshold is met.

20. The base station of claim 19 wherein the means for performing constellation control eliminates a first constellation point in the non-exclusive multiplexing constellation.

21. The base station of claim 20 wherein the first constellation point has a minimum distance from a second constellation point in the non-exclusive multiplexing constellation.

22. The base station of claim 21 wherein the minimum distance is a Hamming distance.

23. The base station of claim 19 wherein the constellation control includes a cyclic redundancy check (CRC) code.

24. The base station of claim 19 wherein the channel robustness threshold is based on one of the following metrics: signal-to-noise ratio (SNR), fade rate, bit error rate or frame error rate.

25. The base station of claim 19 wherein the means for transmitting the at least one active control channel uses one of time-division multiplexing (TDM), frequency-division multiplexing (FDM), code-division multiplexing (CDM) or a combination thereof.

26. The base station of claim 19 wherein the at least one active control channel is a forward link control signaling (FLCS) and the base station is part of a Ultra Mobile Broadband (UMB) wireless system.

27. A non-transitory computer-readable medium including program code stored thereon, comprising:
   program code for preparing the at least one active control channel for transmission in a next frame using a transmitter data processor, wherein the at least one active control channel is prepared for transmission using a non-exclusive multiplexing constellation;
   program code for assessing channel robustness of the at least one active control channel based on a channel robustness threshold; and
   program code for performing constellation control or power control on the non-exclusive multiplexing constellation of the at least one active control channel, prior to transmitting the at least one active control channel, if the channel robustness threshold is not met; or
   program code for transmitting the at least one active control channel if the channel robustness threshold is met.

28. The non-transitory computer-readable medium of claim 27 wherein the program code for performing constellation control further comprises program code for eliminating a first constellation point in the non-exclusive multiplexing constellation.

29. The non-transitory computer-readable medium of claim 28 wherein the first constellation point has a minimum distance from a second constellation point in the non-exclusive multiplexing constellation.

30. The non-transitory computer-readable medium of claim 29 wherein the minimum distance is a Hamming distance.

31. The non-transitory computer-readable medium of claim 27 wherein the constellation control includes a cyclic redundancy check (CRC) code.

32. The non-transitory computer-readable medium of claim 27 wherein the channel robustness threshold is based on one of the following metrics: signal-to-noise ratio (SNR), fade rate, bit error rate or frame error rate.

33. The non-transitory computer-readable medium of claim 27 wherein the program code for transmitting the at least one active control channel uses one of time-division multiplexing (TDM), frequency-division multiplexing (FDM), code-division multiplexing (CDM) or a combination thereof.

34. The non-transitory computer-readable medium of claim 27 wherein the at least one active control channel is a forward link control signaling (FLCS) and is part of a Ultra Mobile Broadband (UMB) wireless system.

* * * * *